Feb. 16, 1926.

R. W. SCHUETTE 1,573,197

FLEXIBLE COUPLING

Filed April 7, 1924

INVENTOR
Robert W. Schuette,
by Edward A. Laurence,
his attorney.

Patented Feb. 16, 1926.

1,573,197

UNITED STATES PATENT OFFICE.

ROBERT W. SCHUETTE, OF MUNHALL BOROUGH, PENNSYLVANIA.

FLEXIBLE COUPLING.

Application filed April 7, 1924. Serial No. 704,659.

*To all whom it may concern:*

Be it known that I, ROBERT W. SCHUETTE, a citizen of the United States, and residing in the borough of Munhall, in the county of Allegheny and State of Pennsylvania, have invented or discovered the new, useful, and Improved Flexible Coupling, of which the following is a specification.

My invention consists in certain new and useful improvements in flexible couplings.

More particularly my present invention relates to couplings of the Oldham type wherein the shaft ends, which are to be coupled together, are each provided with parallel bearing surfaces which are inserted into and mate in surface contact with the parallel bearing surfaces of recesses or openings in an intermediate or coupler member, the bearing surfaces of the opening at one side of the intermediate member being disposed at right angles to the bearing surfaces at the other side of the intermediate member.

The centrifugal forces of rotation tend to force the lubricant toward the ends of the mating bearing surfaces, and therefore the intermediate portions of the same tend to be unlubricated and are subject to very considerable wear.

To eliminate the friction between such poorly lubricated surfaces I recess the central portions of the bearing surfaces of either the shaft ends or the coupler member or both. These recesses not only eliminate contact which is attended by excessive friction due to poor lubrication, but the recesses may also function as chambers to receive lubricant to be supplied therefrom to adjacent bearing surfaces in surface contact.

To render uniform and constant the supply of lubricant to the bearing surfaces in sliding contact I connect the same by oil or lubricant grooves.

To prevent the lubricant being expelled from the coupling by the forces of rotation, I provide annular covers which are attached to the sides of the intermediate member and which encircle the shaft ends to form pockets in which the expelled lubricant is caught, but which pockets fit the shaft ends with sufficient looseness to provide for parallel and angular misalinement.

Figure 1:
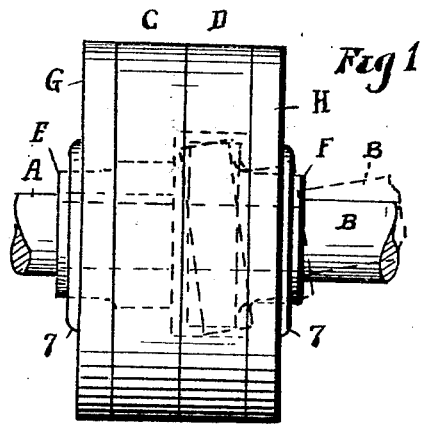
Figure 2:
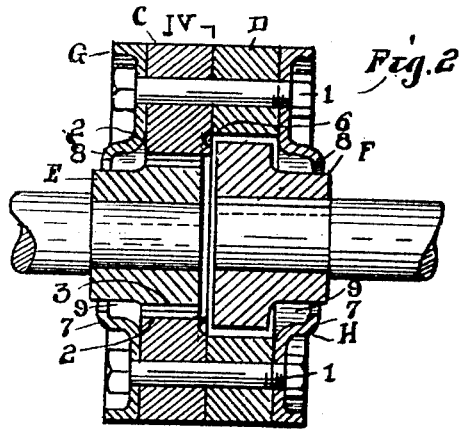
Figure 3:
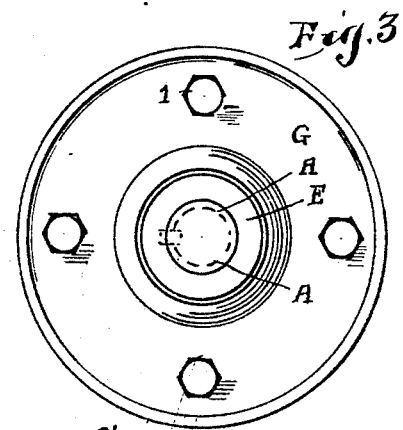
Figure 4:
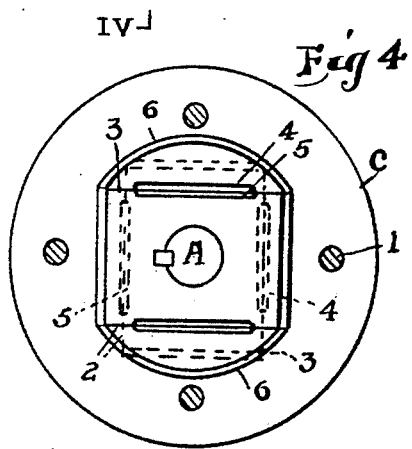
Figure 5:
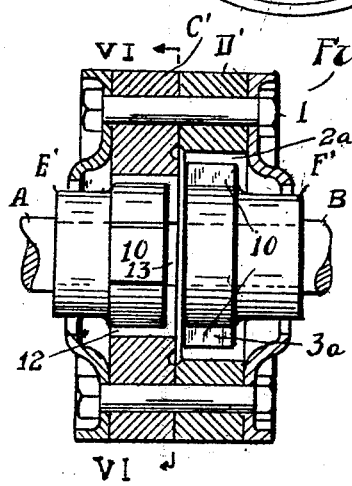
Figure 6:
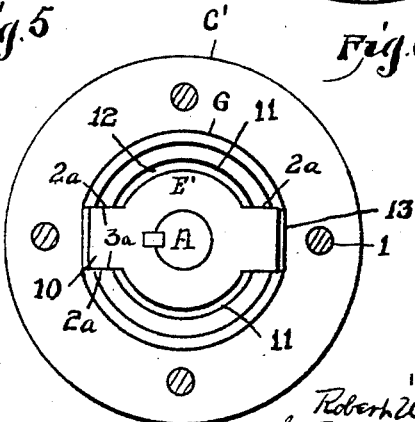

In the accompanying drawings, wherein for the purpose of illustrating practical embodiment of the principles of my present invention, I have shown the same applied to the improved type of Oldham coupling which forms the subject matter of Letters Patent 1,499,880 granted to me on July 1st, 1924. Fig. 1 is a side elevation of a flexible coupling embodying my invention, the shafts being shown in solid lines in alinement, while one of the shafts is shown in dotted lines in angular misalinement; Fig. 2 is a diametric section of the same, the shafts however being shown alined; Fig. 3 is an end view of the same; Fig. 4 is a section taken along the line IV—IV in Fig. 2; Fig. 5 is a view similar to Fig. 2 but showing a slight modification, and Fig. 6 is a sectional view taken along the line VI—VI in Fig. 5.

The following is a detailed description of the drawings.

A and B represent respectively the two shaft ends which are flexibly connected. The intermediate or coupler member of the coupling is comprised of a pair of flanges C and D which are connected together face to face, preferably detachably, as by the bolts 1 which extend through registering holes in the flanges. Each flange is provided with a diametrically disposed opening extending through the same, the opening having side walls which are provided with parallel bearing surfaces 2. When the flanges are connected together, the bearing surfaces of one flange are disposed at right angles to those of the other flange, as shown in Fig. 4.

The shaft ends are provided with bearing surfaces which mate with the bearing surfaces 2 of the flange member. While the bearing surfaces of the shaft ends may be formed directly on the latter, I prefer to provide the shaft ends with hubs E and F respectively, which may be rigidly keyed or otherwise secured on the shaft ends and which are each provided with the opposed, parallel bearing surfaces 3.

The hubs E and F are inserted into the opening of the flanges C and D respectively, and their bearing surfaces 3 are mated in surface contact with the bearing surfaces 2. The openings in the flanges are of sufficient length to permit the surfaces 3 to slide on the surfaces 2. This is to provide for parallel misalinement of the shaft ends and also to permit the bearing surfaces 3 to swivel on the bearing surfaces 2, thus permitting angular misalinement as illustrated in dotted lines in Fig. 1. Sufficient clearance is also provided between the adjacent shaft ends or their hubs to permit angular misalinement, and also to permit relative axial movement of the shaft ends. Thus parallel and angular misalinement and relative axial movement of the shaft ends are all amply provided for.

It is evident that the centrifugal forces set up by the rotation of the coupling will tend to force the lubricant towards the ends of the mating bearing surfaces 2 and 3, thus leaving the intermediate portions of said mating bearing surfaces wholly or partially unlubricated, and thereby resulting in undue wear. Therefore, instead of making the bearing surfaces 2 of the flanges C and D and the bearing surfaces 3 of the hubs E and F continuous, as illustrated in the drawings of my Letters Patent 1,499,880, I provide the said bearing surfaces in the form of pairs of alined but spaced apart flat bearing surfaces, as illustrated in the accompanying drawings, interposing between alined bearing surfaces 2 the recessed or cut back portions 4, and likewise between alined bearing surfaces 3 the similar recessed or cut back portions 5, the adjacent recesses 4 and 5 mating to form chambers or pockets for lubricant. In effect I have cut away the central or intermediate portions of the mating bearing surfaces illustrated in my said Letters Patent to provide means for the better distribution of lubricant. Thus the surface contact of the mating bearing surfaces is confined to the end portions of the same to which the lubricant tends to be forced by the rotation of the coupling. When the coupling is at rest, the lubricant will tend to gather in the chambers formed by such clearances, from which chambers it will be forced when the coupling is in rotation to lubricate the surfaces in sliding contact.

For the further improvement of the distribution of the lubricant, I connect the outer ends of the bearing surfaces of the intermediate member, comprised of the flanges C and D, by oil or lubricant passages 6, which are shown in Fig. 4 as arcuate grooves cut in the inner faces of the flange members and connecting the opposite ends of the openings therein at either side of said openings. When the flange members are attached together face to face said grooves register with each other and thus provide enclosed connecting passages.

It is evident that the rapid rotation of the coupling will tend to cause the lubricant to circulate through said arcuate passages from one set of the mating bearing surfaces to the other, thereby uniformly distributing the lubricant.

To enable me to confine a larger volume of lubricant in the coupling, I provide the annular cover plates G and H which are secured by the bolts 1 on the exterior faces of the flange members C and D, respectively, and which are providel with outwardly extending central bosses 7 having inwardly turned edge flanges 8 which loosely surround the shaft ends or their hubs E and F, with sufficient clearance so as not to interfere with angular misalinement, and which thus forms annular pockets 9 in which a supply of lubricant is maintained. It is evident that the lips 8 will prevent the lubricant being thrown outwardly from the coupling during rotation.

In Figs. 5 and 6 I have shown the hubs E' and F' of circular shape with the bearing surfaces 3$^a$ formed by the side walls of diametrically opposed extensions 10, while the flange members C' and D' have their openings centrally cored out, as at 11 to receive the circular hub portions with sufficient clearance, as at 12 to permit parallel and angular misalinements, while the extensions 10 of the hubs work in the diametrically opposed enlargements 13 of the flange openings, the bearing surfaces 3$^a$ of the hub mating in sliding contact with the bearing surfaces 2$^a$ of the enlargements 13 of the flange openings.

The modification shown in Figs. 5 and 6 is especially adapted for flexible couplings for relatively large size shafts, as it permits flanges of smaller external diameter to be used.

What I desire to claim is:—

1. In a flexible coupling, the combination with a pair of shaft ends which are to be flexibly connected together and each provided on two opposite sides with a pair of alined flat bearing surfaces with a recessed portion separating the same, the bearing surfaces on opposite sides being parallel, and a coupler member provided with openings in its opposite sides, said openings being provided on two parallel sides with flat bearing surfaces, the bearing surfaces of one opening being disposed at right angles to the bearing surfaces of the other opening, one of the shaft ends being inserted into each of said openings and the bearing surfaces of the coupler member mating in flat sliding surface contact with the bearing surfaces of the shaft ends.

2. In a flexible coupling, the combination with a pair of shaft ends which are to be flexibly connected together and each provided on two opposite sides with parallel flat bearing surfaces, and a coupler member provided with openings in its opposite sides, each of said openings being provided on two opposite sides with a pair of alined flat bearing surfaces with a recessed portion separating the same, the bearing surfaces on the opposite sides of the opening being parallel, the bearing surfaces of one opening being disposed at right angles to those of the other opening, one of said shaft ends being inserted into each of the openings in said coupler member with its flat bearing surfaces mating in sliding surface contact with the bearing surfaces of the coupler member.

3. In a flexible coupling, the combination with a pair of shaft ends which are to be flexibly connected together and each provided on two opposite sides with a pair of alined flat bearing surfaces with a recessed portion separating the same, the bearing surfaces on opposite sides being parallel, and a coupler member provided with openings in its opposite sides, each of said openings being provided on two opposite sides with a pair of alined flat bearing surfaces with a recessed portion separating the same, the bearing surfaces on the opposite sides of an opening being parallel, and the bearing surfaces of one opening being disposed at right angles to those of the other opening, one of said shaft ends being inserted into each of said openings with the bearing surfaces of the shaft end mating in flat sliding contact with the bearing surfaces of the opening.

4. In a flexible coupling, the combination of a pair of opposed shaft ends to be coupled together and each provided with parallel flat bearing surfaces, with a coupler member provided at either side with an opening adapted to receive one of said shaft ends, said openings being disposed at right angles to each other, said openings being provided with parallel flat bearing surfaces which mate in sliding surface contact with the bearing surfaces of the shaft ends, and lubricant passages connecting the opposite ends of each of said openings for the purpose described.

5. In a flexible coupling, the combination of a pair of opposed shaft ends to be coupled together and each provided with parallel flat bearing surfaces, with an intervening member comprised of a pair of flanges attached together face to face, each of said flanges being provided with an opening to receive one of said shaft ends and said openings being disposed at right angles to each other, and said openings being provided with parallel flat bearing surfaces adapted to mate in sliding surface contact with the bearing surfaces of the shaft ends, and said flanges having passages for lubricant cut therein and connecting the opposite ends of the openings for the purpose described.

Signed at Pittsburgh, Pa., this 3rd day of April 1924.

ROBERT W. SCHUETTE.